April 16, 1963  W. J. OLIPHANT ETAL  3,085,588
VALVE WITH SEALING MEANS
Filed Oct. 31, 1960

INVENTORS.
WILLIAM J. OLIPHANT
RICHARD H. CORNELL
BY
Lawrence G. Norris
ATTORNEY

United States Patent Office

3,085,588
Patented Apr. 16, 1963

3,085,588
VALVE WITH SEALING MEANS
William John Oliphant, Wakefield, and Richard Henry Cornell, Marblehead, Mass., assignors to General Electric Company, a corporation of New York
Filed Oct. 31, 1960, Ser. No. 66,026
11 Claims. (Cl. 137—116)

This invention relates to valves and more particularly to valves having sealing means to prevent leakage of pressurized fluids therefrom.

In many fluid supply systems involving high fluid pressures, the sealing of valves against leakage is critical. In fuel supply systems for turbine engine afterburners, for example, valve means must be provided which are effective to control fuel flow with positive sealing characteristics. An afterburner fuel system may conveniently be provided with a check valve which opens in response to fluid pressure developed by a pump directly geared to the engine shaft. The check valve must be able to perform several functions in such a system. First of all, it must prevent reverse flow of fuel out of the afterburner control system to prevent the loss of substantial quantities of fuel and also to avoid the relatively long time delay which otherwise would be encountered in recharging the system on start up. Second, the valve must provide in most systems for drainage of the afterburner fuel pump cavity in order to prevent overheating of the pump. And third, the valve must seal off the drain connection when operation of the afterburner is initiated.

Now it is the general practice in this kind of system to actuate the valve from its drain position to its sealing position in response to a buildup in pressure at the discharge of the afterburner fuel pump, which occurs when fuel is delivered to the pump. Now because when the pressure buildup at the pump discharge first occurs, the valve is still in the drain position, fuel will begin to flow through the drain connection at a relatively high velocity. In cases where O rings or other flexible material types of seals are used, and it is a common practice to use such materials because of their superior sealing capabilities, the high velocity of the fuel passing through the drain connection tends to tear the sealing material as the valve approaches its sealing position. In addition, various other problems have been encountered in valves of this type with respect to ensuring a positive seal, assuring continuous alignment of the sealing surfaces over a large number of cycles of operation, and the like.

It is accordingly one object of our invention to provide a valve having improved sealing characteristics.

It is another object of our invention to provide an improved check and drain valve in which the above-mentioned problem of tearing of the flexible sealing material is substantially alleviated.

Further objects and advantages of the invention will become apparent as the following description proceeds.

Briefly stated, in accordance with a preferred embodiment thereof, we may carry out our invention by providing a valve casing having a port which may be closed by the peripheral surface of a valve core mounted for reciprocation in the casing, and which communicates with a passage formed in the valve core in an open position of the valve. In its closed position, a nose portion of the core is arranged to abut upon a valve seat which is formed of a material, such as aluminum alloy, having greater resiliency than the material of the valve core. Means are provided to urge the nose portion of the core into sealing engagement with the seat. The sealing surface of the seat is formed with one or more grooves of closed geometric configurations, such as circles. These grooves accommodate lateral distortion of the material of the seat by the core, and thus prevent "dimpling" of the seat transversely to its surface, which would otherwise interfere with the sealing engagement. An additional sealing action is provided by a sealing member peripherally engaging the nose portion of the valve core, and arranged in a recess in the valve casing to be deformed by the valve core in the closed position thereof. The sealing member is formed of a material having still greater resiliency than the valve seat, such as rubber or plastic.

According to a further feature of the invention, precise facial contact between the nose portion of the valve core and the valve seat is insured by providing the seat, which is secured to the valve casing, with a spherical surface axially abutting a supporting surface in a plane normal to the axis of reciprocation of the core. The casing and seat assembly is rotatable and slidable on the supporting surface to automatically secure parallel alignment of the nose portion of the core with the seat.

We may combine the foregoing valve with a second valve to form a combination check and drain valve which is operable in response to fluid pressure in a fuel system. The aforementioned valve is utilized as a drain valve, and the valve core is secured to a check valve core which is reciprocable within a check valve casing to control outlet ports formed in the latter. The combined valve core is arranged to be urged by fluid pressure received through a valve inlet toward an open position of the check valve, in which the core closes and effectively seals the port of the drain valve casing in the aforementioned manner, thereby reducing the velocity of the fluid flowing through the valve prior to engagement of the core with the flexible sealing means. The valve core is biased by suitable means, such as a compression spring, toward a position closing the check valve, when the valve core is not subjected to an overbalancing fluid pressure. The drain valve portion is thus opened, and is communicated with the valve inlet through the aforementioned passage formed in the drain valve core to drain fluid from the inlet, which may be connected to a continuously driven pump of a fuel system to drain an impeller cavity therein.

While the specification concludes with claims specifically pointing out the subject matter which we regard as our invention, it is believed that the invention will be more clearly understood from the following detailed description of a preferred embodiment thereof, taken in connection with the accompanying drawings, in which:

Figure 1:
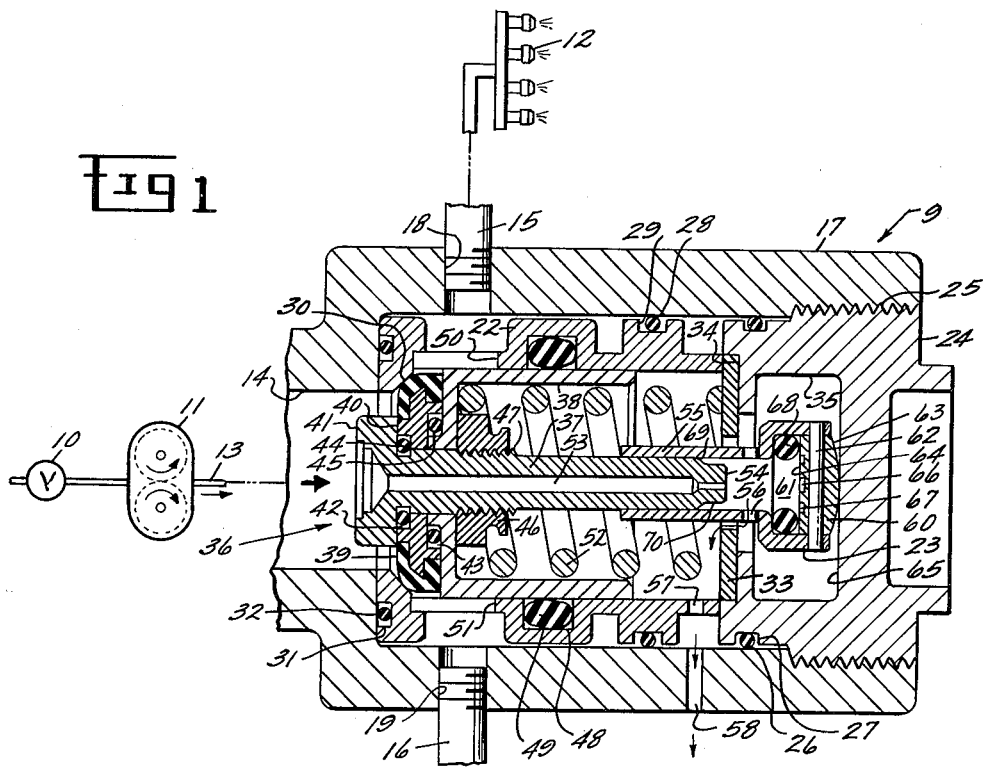
FIG. 1 is a sectional view in elevation of a combination check and drain valve embodying the invention, schematically showing elements of an associated fuel system.

Referring to the drawing, a preferred embodiment of our invention in a combination check and drain valve, generally designated 9, is shown in operative relation to an afterburner fuel system which includes a fuel shutoff valve 10, a pump 11, and an afterburner spraybar nozzle 12. The check and drain valve is arranged in serial flow relation between the pump and the spraybar, being connected to the pump by means of a conduit 13 and a valve inlet 14, and to the spraybar by means of conduits 15 and 16. The last mentioned conduits may be connected to a fuel manifold interposed between the valve and spraybar, and to other system components. A housing 17 encloses the valve components, and forms outlet ports 18 and 19, into which the conduits 15 and 16 are threaded, respectively. A valve casing assembly, comprising a check valve casing 22 and a drain valve casing and seat guide 23, is received within the housing 17. A cap 24 is threaded at 25 within an open end of the housing to enclose the valve elements. A resilient O-ring seal 26 is disposed in a recess 27 formed about the cap, and engages the interior surface of the housing to prevent fluid leakage through the threads 25. A further O-ring seal 28 is disposed within a groove 29 formed about the check valve casing 22, for a similar purpose.

An annular check valve seat 30 is disposed within an end of the housing adjacent to the inlet, and is formed with a groove 31 receiving an O-ring seal 32. The check valve casing 22 is positioned between the seat 30 and a retaining ring 33, which is seated in a groove 34 formed in the inner end of the cap 24. The drain valve casing 23 is loosely received in a recess 35 formed in the cap 24, and is confined to limited axial movement by the retaining ring 33.

A valve core assembly generally designated 36 is received within the casings 22 and 23 for reciprocation along the axis shown, and includes a drain valve core 37 and a check valve core 38. The core assembly includes a resilient washer 39, which is secured by a retaining disc 40 and interposed between the valve core 38 and an enlarged head 41 of the drain valve core 37. The retaining disc 40 is formed with grooves 42 and 43, in which O-ring seals 44 and 45 are disposed, respectively, to prevent fluid leakage from the inlet into the interior of the core assembly. The check valve casing 22 is provided with a recess 48 receiving a resilient sealing ring 49, which slidably engages the exterior surface of the core 38 to prevent leakage between the casing and the core. The core assembly is secured by means of a nut 46 threaded at 47 upon the core 37.

The valve casing 22 is formed with ports 50 and 51, which communicate the inlet 14 with the ports 18 and 19 in an open position of the check valve. The core assembly is urged toward the open position of the check valve by fluid pressure supplied by the pump 11, at such times as the shut-off valve 10 is opened.

A resilient helical spring 52 is interposed between the check valve core 38 and the retaining ring 33 to bias the valve core to the left as viewed in FIG. 1. When the valve 10 is closed to interrupt the supply of fuel to the pump 11, thus diminishing the fluid pressure applied to the valve core, the spring 52 closes the check valve and interrupts communication between the inlet 14 and the ports 50 and 51.

It is desirable to drain the impeller cavity of the pump 11 when the check valve is closed, to prevent overheating of the pump. For this purpose, the valve core 37 is formed with a passage 53 extending therethrough from the inlet 14 to a nose portion 54. The core 37 is slidably received within a guide portion 55 of the casing 23, which is formed with a drain port 56 normally communicating with the passage 53 through the interior of the casing. With the check valve in the closed position shown in FIG. 1, fluid drains from the inlet 14 through the passage 53, the port 56, a port 57 formed in the valve casing 22, and a port 58 formed in the housing 17 between the seals 26 and 28. In the afterburner fuel system shown, the drained fuel is preferably discharged overboard from the aircraft. In other applications, however, the drained fluid may be returned to a supply tank.

In the open position of the check valve, in which fuel is supplied to the spraybar 12, a substantial fluid pressure developed by the pump 11 is applied to the valve core 37, 38 and to the passage 53. We provide improved means for sealing the passage 53 against leakage of the pressurized fuel from the system through the drain ports 56, 57, and 58. These means include a valve seat 60, which is formed of a material having greater resiliency than the material of the core 37 to afford maximum sealing effectiveness. We prefer to form the core of steel, and the seat of aluminum alloy. The seat 60 is mounted within a recess 61 of the casing 23 by means of a roll pin 62, or other suitable fastener.

The seat 60 is formed with a convex surface 63 disposed oppositely to a seating surface 64, which conforms to the nose portion 54 of the core 37 for sealing engagement therewith. The convex surface 63 abuts a supporting surface 65 of the cap 24 which is normal to the axis of reciprocation of the core. The guide portion 55 cooperates with the core 37 to cause the assembly of the casing and seat to rotate and slide laterally about the surface 63 upon the surface 65, thereby insuring the alignment of the sealing surface 64 with the nose portion 54 of the core. Uniform surface abutment and sealing engagement between the nose portion and the surface 64 between these members is thus automatically obtained.

Because of the relatively great resiliency of the seat 60, the high pressure of the surface contact with the nose portion 54 may induce "dimpling," or distortion in a normal direction, of the surface 64. In order to prevent disruption of the sealing engagement by such distortion in the seat material, we form grooves 66 and 67 in the surface 64. The grooves are preferably circular as shown, but may have any desired closed geometric configuration which will not produce leakage between the nose and the seat. The grooves accommodate distortion of the material of the seat, with the result that the surface 64 maintains its conformity with the nose 54.

Figure 2:
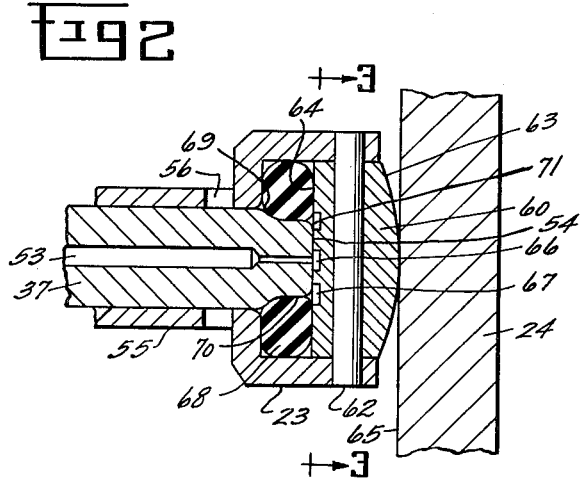
FIG. 2 is a sectional view on an enlarged scale of the elements of the drain valve of FIG. 1, shown in a closed position.
Figure 3:
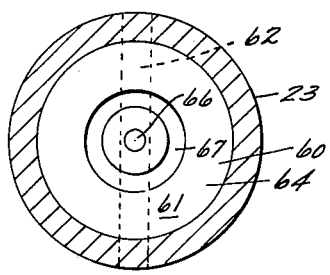
FIG. 3 is a sectional end view taken along line 3—3 in FIG. 2, looking in the direction of the arrows.

An additional sealing effect is provided by an annular sealing member 68, which is formed of a material having greater resiliency than that of the seat, such as rubber or plastic. The member 68 is positioned within the recess 61 beneath the seat 60. Increased sealing effectiveness is obtained by forming the core with a rounded shoulder 69 and a reduced portion 70 adjacent the nose 54. The rounded shoulder engages the sealing member in the closed position of the core shown in FIG. 2. Tearing of the sealing member, which might otherwise result from rapid movement of the core and by high velocity fluid flow, is prevented by the rounded configuration of the shoulder and by closure of the ports 56 prior to engagement of the core with the O-ring 61. The nose portion is also rounded at 71 for a similar purpose.

As the valve core is initially moved to the right as viewed in FIG. 1, the drain port 56 is closed by the periphery of the core to discontinue the drainage of fluid from the inlet 14. However, some leakage may take place until the nose of the core engages the seat surface 64 and the sealing member 68. The exertion of fluid pressure upon the core then provides an effective seal between the nose and the sealing elements. A dual sealing action is afforded by the metal-to-metal contact between the nose 54 and the seat 60, and by the metal-to-rubber contact between the shoulder 70 and the sealing member 68.

It will be apparent from the foregoing description that the improved sealing means which forms a feature of the invention may be applied in various valve arrangements other than that of the improved check and drain valve in combination with which these sealing means have been illustrated and described. Various additional changes and modifications will readily occur to those skilled in the art, and it is our intention to cover all such changes and modifications in the appended claims.

What we claim as new and desire to secure by Letters Patent of the United States is:

1. In a valve, a valve casing having an inlet and an outlet port together with passage means forming a fluid flow path therebetween, a valve core slidably received in said casing for movement to a closed position closing off said flow path, and sealing means comprising a seat formed of a material having greater resiliency than said core and a sealing member formed of a material having greater resiliency than said seat, said seat and said sealing member engaging surface portions of said core in said closed position thereof to seal said inlet from said outlet, said seat being formed with grooves of closed geometric configuration upon a surface thereof engaging said surface portion of said core, said grooves accommodating distortion of the material of said seat by said core to prevent distortion normal to said surface of said seat.

2. In a valve, a valve casing having an inlet and an outlet port, a valve core having a passage extending therethrough and a nose portion intersected by said passage, said valve core slidably received in said casing and movable between first and second positions, said valve core in said first position connecting said inlet with said outlet port in fluid flow communication through said passage, a seat mounted in said casing having a sealing surface conforming to said nose portion, said seat having greater resiliency than said valve core, said valve core having a cylindrical portion forming a rounded annular shoulder spaced along said core from said nose portion, and an annular sealing member overlying a peripheral portion of said sealing surface and having greater resiliency than said seat, said nose portion engaging said sealing surface and said annular shoulder abutting said sealing member when said valve core is in said second position to seal said passage so as to prevent fluid flow from said inlet to said outlet port through said passage.

3. In a valve, a valve casing having an inlet and an outlet port, a valve core slidably received in said casing for reciprocal movement along an axis, said core formed with a passage extending therethrough and biased to a position connecting said inlet in fluid flow communication with said port, a seat having a sealing surface formed of a material having greater resiliency than the material of said core, said casing having a surface transverse to said axis, said seat having a convex surface resting upon said surface of said casing, and a seat guide secured to said seat and slidably receiving said core, said core being exposed to fluid pressure in said inlet to thereby urge said core into engagement with said sealing surface to seal said passage, said core guide aligning said seat with said core by movement of said convex surface upon said surface of said casing.

4. A valve as recited in claim 3, together with a sealing member overlying said sealing surface peripherally, said sealing member having greater resiliency than said seat.

5. A valve as recited in claim 3, said sealing surface being formed with grooves of closed geometric configuration, said grooves being positioned to be overlaid completely by said core in engagement with said sealing surface.

6. In a valve, a valve casing having an inlet, a valve core slidably received in said casing for reciprocal movement along an axis, said core formed with a passage extending therethrough and communicating with said inlet, a seat having a sealing surface formed of a material having greater resiliency than the material of said core, a sealing member peripherally overlying a portion of said ceiling surface, said sealing member formed of a material having greater resiliency than the material of said seat, said casing having a surface normal to said axis, said seat having a convex surface resting upon said surface of said casing, a seat guide having an outlet port, said seat guide secured to said seat and slidably receiving said core for movement to a first position communicating said passage with said outlet port and to a second position closing said outlet port and engaging said core with said sealing surface and said sealing member, said sealing surface being formed with grooves of closed geometric configuration overlain by said core in said second position thereof, said core guide aligning said seat with said core by movement of said convex surface upon said surface of said casing.

7. In a combination check and drain valve, a valve casing formed with an inlet and first and second outlet ports, a valve core slidably received in said casing, means urging said core to a first position closing said first port and communicating said second port with said inlet, said core being exposed to pressurized fluid received through said inlet to thereby urge said core to a second position closing said second port and communicating said first port with said inlet, a seat having greater resiliency than said core, a sealing member peripherally overlying said seat, said core engaging said sealing member and said seat in said second position to seal said second port from said inlet.

8. A valve as recited in claim 7, said seat being formed on a surface thereof engaging said core with grooves of closed geometric configuration, said grooves being positioned to be overlaid completely by said core in said second position, said grooves accommodating distortion of the material of said seat by said core to prevent distortion of said surface of said seat normal thereto.

9. A valve as recited in claim 7, said seat further being formed with a convex surface of revolution, together with means supporting said core for reciprocation along a fixed axis, and means forming a supporting surface normal to said axis, said convex surface being supported in rolling engagement upon said supporting surface and aligning said seat for sealing engagement with said core.

10. In a valve, a valve casing having an inlet and an outlet port together with passage means forming a fluid flow path therebetween, a valve core slidably supported in said casing for reciprocal movement along a fixed axis to a closed position closing off said said fluid flow path, a seat formed of a material having greater resiliency than said core and having a sealing surface thereon engaging surface portions of said core in said closed position to seal said inlet port from said outlet port, and means forming a supporting surface transverse to said axis, said seat having a convex surface of revolution in rolling engagement with said supporting surface for aligning said sealing surface with said core surface portions for sealing engagement therebetween.

11. A valve as recited in claim 10, the sealing surface of said seat being formed with grooves of closed geometric configuration for engagement with said core surface portions, said grooves accommodating distortion of the material of said seat by said core to prevent distortion normal to said sealing surface of said seat.

References Cited in the file of this patent
UNITED STATES PATENTS

| | | |
|---|---|---|
| 453,265 | Mayo | June 2, 1891 |
| 2,645,449 | Gulick | July 14, 1953 |
| 2,885,176 | Bryant | May 5, 1959 |
| 2,888,949 | Evans | June 2, 1959 |